(12) United States Patent
Uchiyama et al.

(10) Patent No.: US 6,346,959 B1
(45) Date of Patent: Feb. 12, 2002

(54) IMAGE FORMING APPARATUS AND METHOD FOR IMAGE FORMATION

(75) Inventors: Koichi Uchiyama; Noboru Inamine, both of Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 0 days.

(21) Appl. No.: 08/742,826

(22) Filed: Oct. 31, 1996

(30) Foreign Application Priority Data

Nov. 6, 1995 (JP) .............................................. 7-287511

(51) Int. Cl.[7] ................................................ B41J 35/16
(52) U.S. Cl. ...................................................... 347/172
(58) Field of Search ............................... 347/172, 174, 347/175, 177, 178, 185, 186, 187, 204, 200, 173, 40, 41, 43, 159; 358/500

(56) References Cited

U.S. PATENT DOCUMENTS

| | | | |
|---|---|---|---|
| 3,651,246 A | 3/1972 | Bergero ....................... 358/500 |
| 3,679,818 A | 7/1972 | Courtney-Pratt ............ 358/508 |
| 4,430,668 A | 2/1984 | Miles, Jr. ..................... 358/515 |
| 4,482,901 A | * 11/1984 | Kudelski et al. ............. 347/159 |
| 5,227,840 A | * 7/1993 | Mirzaoff et al. .............. 355/83 |
| 5,259,680 A | * 11/1993 | Shimizu et al. ............. 400/237 |
| 5,268,707 A | * 12/1993 | Katsuma et al. | |
| 5,521,722 A | * 5/1996 | Colvill et al. ................ 358/500 |

FOREIGN PATENT DOCUMENTS

| | | | |
|---|---|---|---|
| FR | 2 524 166 | 9/1983 | |
| JP | 360139470 | * 8/1985 | .............. B41J/3/20 |
| WO | 89/05730 | 6/1989 | |

* cited by examiner

Primary Examiner—N. Le
Assistant Examiner—Anh T. N. Vo
(74) Attorney, Agent, or Firm—Kanesaka & Takeuchi

(57) ABSTRACT

An image forming apparatus is used for forming a print image on a color image forming sheet on which a plurality of units is formed in a regular pattern. Each unit is formed of plural color areas for showing one color portion. The image forming apparatus includes a storing device for storing image plotting data showing color-plotted images; a control device for translating the image plotting data into print image data including plural groups of digits corresponding to the color areas in one unit; a detecting device for detecting a position of the color image forming sheet on the image forming apparatus and outputting a detection signal upon detection of the position; and a recording device for selectively covering the plural color areas on the color image forming sheet according to the print image data and the detection signal from the detecting means. Thus, the color-plotted image is produced on the color image forming sheet.

8 Claims, 4 Drawing Sheets

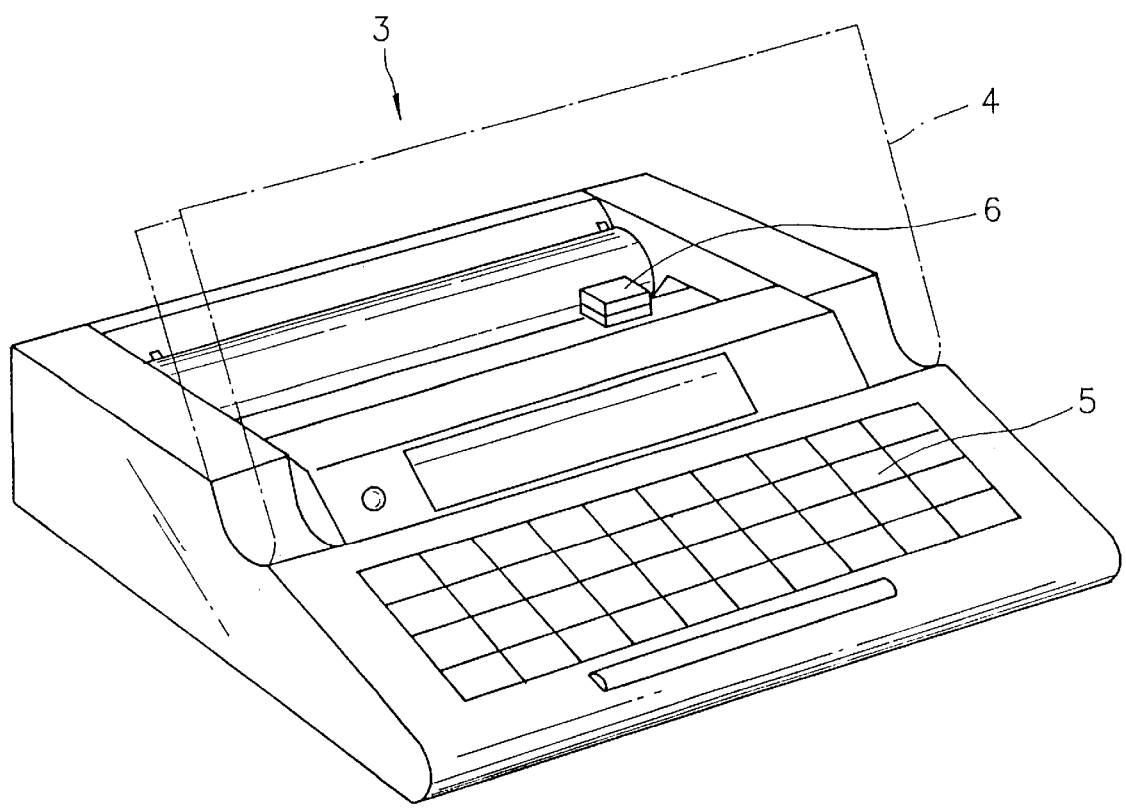
F I G. 4

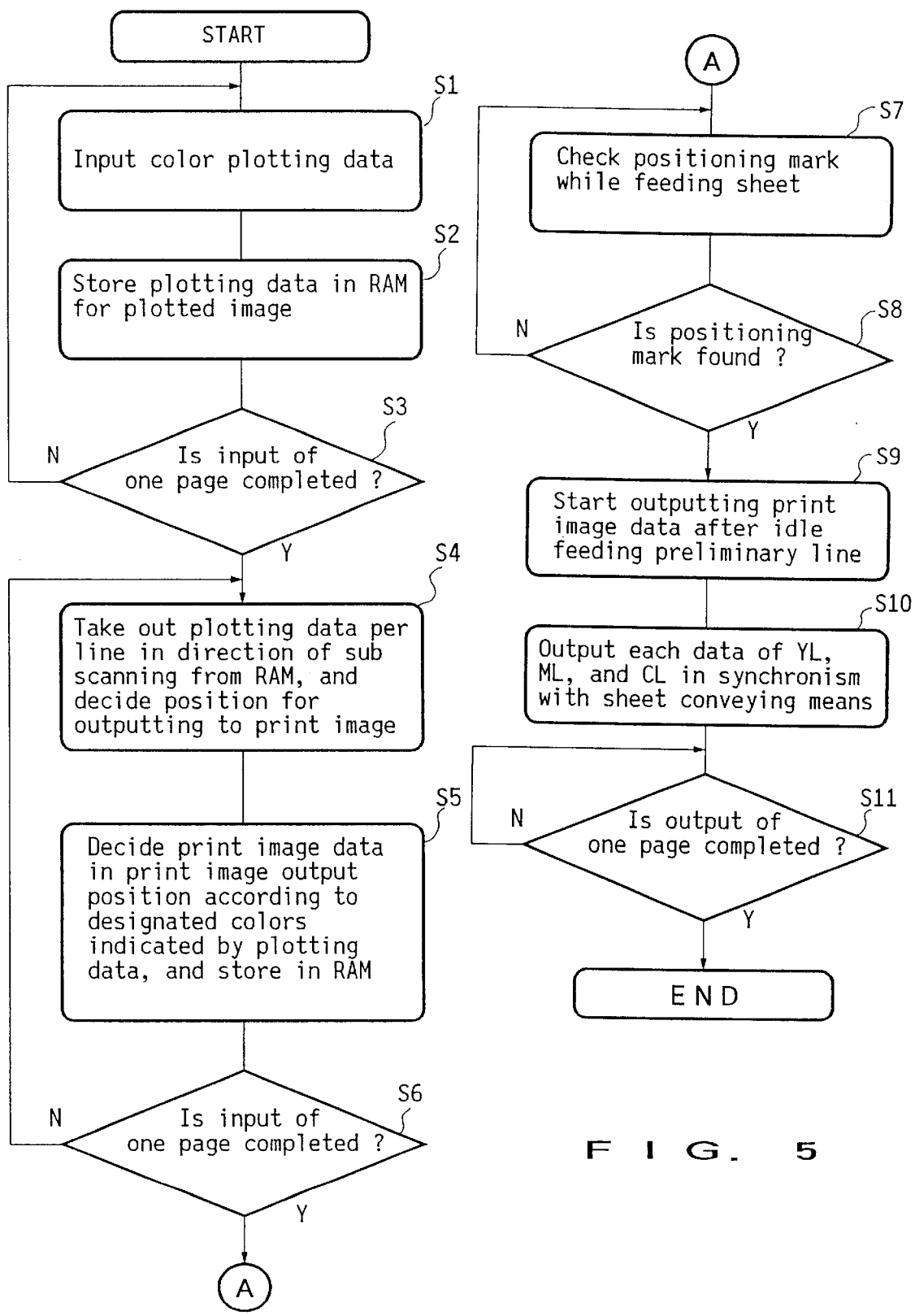
F I G. 5

IMAGE FORMING APPARATUS AND METHOD FOR IMAGE FORMATION

BACKGROUND OF THE INVENTION

The present invention relates to an image forming apparatus capable of forming an image of desired colors by using a digital equipment, such as a word processor, on an image forming sheet on which a plurality of color areas are regularly formed, and a method for forming the image.

There has been utilized an image forming apparatus, such as a transfer ribbon type printer, an ink jet printer, etc., as a printer of a word processor. When such an image forming processor driven by digital control is used in color printing, a transfer ribbon for at least three primary colors is used, or an ink jet mechanism for the three primary colors is provided, to successively print three images of the three primary colors respectively on printing paper.

According to color printing performed by the use of the image forming apparatus mentioned above, the kind and amount of the transfer ribbon or the size of the printing facility itself will become three to four times as large as those used in a monochromatic printing apparatus.

SUMMARY OF THE INVENTION

It is an object of the present invention to provide an image forming apparatus which is capable of color printing by a single printing operation, and a method of forming images.

According to a first aspect of the present invention, there is provided an image forming apparatus for use in forming a print image of desired colors on a color image forming sheet on which a plurality of color areas are regularly formed, comprising recording means for selectively changing colors of a desired part of said color areas on said color image forming sheet; and control means for producing print image data for forming a print image with a color mixture of said color areas by changing at least a part of colors of said color areas on said color image forming sheet in accordance with plotted image data showing a plotted image, and for controlling said recording means on the basis of said print image data, to thereby form a print image on said color image forming sheet.

According to a second aspect of the present invention, there is provided an image forming apparatus for use in forming a print image of desired colors on a color image forming sheet on which a plurality of color areas are regularly formed, comprising display means for displaying a plotted image; input means for designating colors for said plotted image displayed on said display means; recording means for selectively changing colors of a desired part of said color area on said color image forming sheet; and control means for controlling said recording means on the basis of color designation by said input means, and changing color in at least a part of said color area on said color image forming sheet, to thereby form a print image on said color image forming sheet with a mixture of colors of said color area.

According to a third aspect of the present invention, there is provided an image forming apparatus for use in forming a print image of desired colors on a color image forming sheet on which a plurality of color areas are regularly formed, comprising display means for displaying a plotted image; input means for designating colors for said plotted image displayed on said display means; recording means for selectively changing colors of a desired part of said color area on said color image forming sheet; conveying means for conveying said color image forming sheet in a predetermined direction; detecting means for detecting the position of said color image forming sheet and outputting a detection signal; and control means for driving said conveying means on the basis of a detection signal from said detecting means, and driving said recording means on the basis of color designation by said input means in synchronism with the drive of said conveying means, to thereby change the color of at least a part of said color area on said color image forming sheet, thus forming a print image on said color image forming sheet with a mixture of colors of said color area.

According to a fourth aspect of the present invention, there is provided an image forming apparatus claimed in the third aspect, wherein said color area of said color image forming sheet consists of three colors of cyan, magenta and yellow, and said recording means has a plurality of recording elements which are regularly arranged correspondingly to said color area.

According to a fifth aspect of the present invention, there is provided an image forming apparatus claimed in the third aspect, wherein said color area of said color image forming sheet consists of three colors of cyan, magenta and yellow; said conveying means conveys said color image forming sheet in a direction intersecting at right angles with said stripes; and said recording means is provided with a plurality of recording elements regularly arranged in said direction of conveyance at a pitch corresponding to said pitch of stripes on said color image forming sheet, said recording means being movable in a direction intersecting at right angles with said direction of conveyance.

According to a sixth aspect of the present invention, there is provided an image forming apparatus as claimed in the fifth aspect, wherein said recording elements form dots of predetermined colors at a size corresponding to the width of said stripe, on the stripe of each color on said color image forming sheet.

According to a seventh aspect of the present invention, there is provided an image forming method for forming a print image of desired colors on a color image forming sheet by a recording means, said color image forming sheet including a plurality of color areas regulary formed, said recording means selectively changing the colors of a desired part of said color area of said color image forming sheet, said image forming method comprising the steps of producing print image data on the basis of plotted image data showing a plotted image, said print image data for forming a print image with a mixture of colors of said color areas of said color image forming sheet by changing at least a part of colors of said color areas of said color image forming sheet, controlling said recording means on the basis of said print image data to thereby form a print image on said color image forming sheet.

BRIEF DESCRIPTION OF THE DRAWINGS

FIG. 4 is a perspective view showing the constitution of the first embodiment of the present invention; and FIG. 5 is a flowchart showing the flow of control procedures in the first embodiment of the present invention.

DESCRIPTION OF THE PREFERRED EMBODIMENTS

Figure 2:
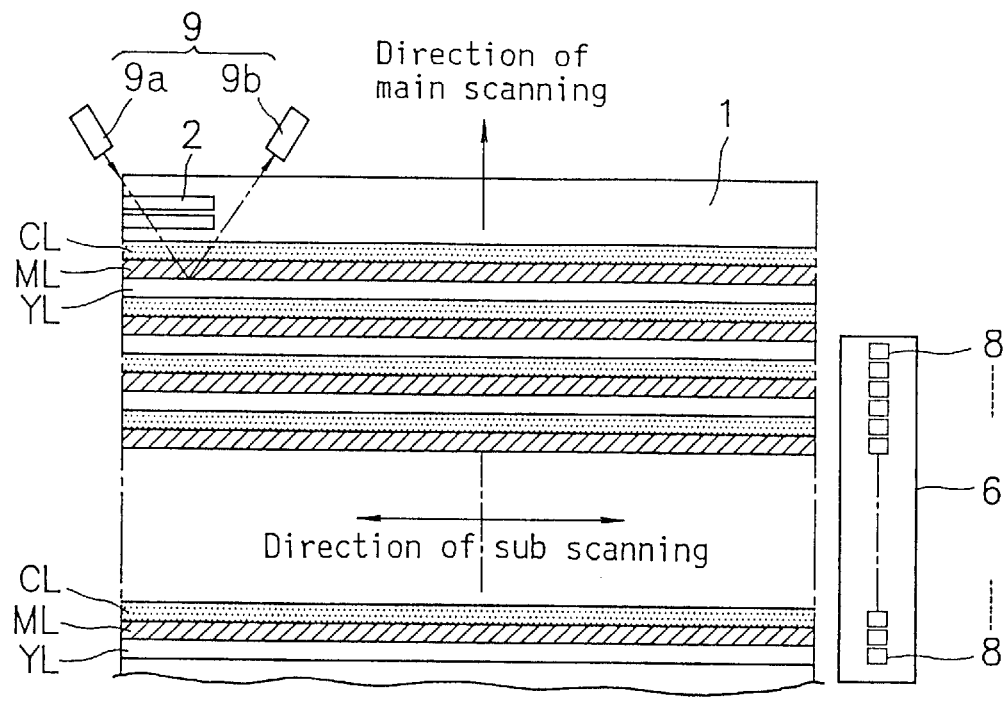
FIG. 2 is a view showing a color image forming sheet to be used in the first embodiment of the present invention, and a part of the constitution of the color image forming apparatus.
Figure 3:
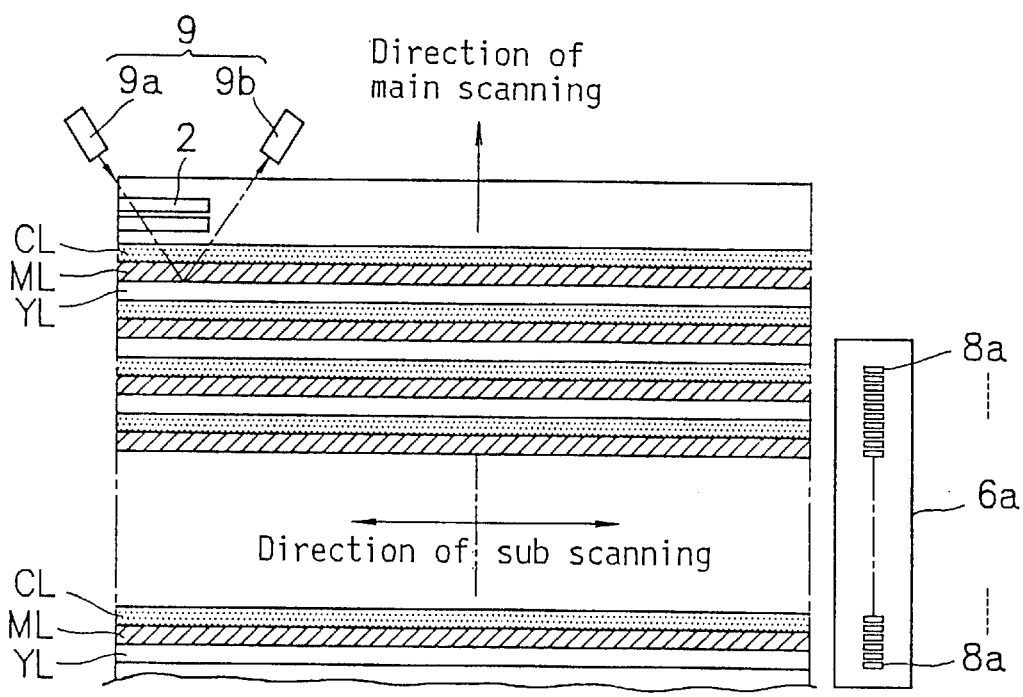
FIG. 3 is a view showing a color image forming sheet to be used in the second embodiment of the present invention, and a part of the constitution of the color image forming apparatus.

One example of the embodiments of the present invention will be explained with reference to FIGS. 1 to 5. A color image forming sheet to be used in the present invention will be explained. The color image forming sheet is a sort of sheet on which color areas of multiple colors are regularly arranged. The sheet may be made of paper, plastic, etc. As shown in FIGS. 2 and 3, the color areas on the color image forming sheet 1 of the present example include three primary colors of cyan, magenta and yellow which are repetitively printed on the sheet without spatial discontinuance in a predetermined order so that the three colors will make mutually parallel bands of predetermined width. Hereinafter these three bands are called yellow line YL, magenta line ML, and cyan line CL.

When the width of each band is 0.2 mm and the reflection density of the magenta line ML is 0.30, the reflection density of the cyan line CL is 0.20, and the reflection density of the yellow line YL is 0.38, the colors are mixed to present a ground color of a creamy type on the whole.

When the width of each band is 0.2 mm and the reflection density of the magenta line ML is 0.36, the reflection density of the cyan line CL is 0.23, and the reflection density of the yellow line YL is 0.45, the colors are mixed to present a ground color of a pink type on the whole.

When the width of each band is 0.2 mm and the reflection density of the magenta line ML is 0.33, the reflection density of the cyan line CL is 0.33, and the reflection density of the yellow line YL is 0.37, the colors are mixed to present a ground color of a grayish type on the whole.

When the width of each band is 0.2 mm and the reflection density of the magenta line ML is 0.40, the reflection density of the cyan line CL is 0.37, and the reflection density of the yellow line YL is 0.51, the colors are mixed to present a ground color of a greenish type on the whole.

The reflection density stated above is a mass expressing the degree of light absorption by a substance at the time of reflection. That is, let $I_0$ be the intensity of incident light and I be the intensity of reflected light, and the reflection density D will be $\log_{10}(I_0/E)$. A reflection densitometer for measuring the reflection density is a reflection densitometer manufactured by Sakata Inks Co., Ltd. Measurements are made within the range of 0 to 2.5 density and 0 to 2.5 colorimetric density.

As shown in FIGS. 2 and 3, there is a positioning mark 2 at the upper end of the color image forming sheet 1, for positioning each line of the color area and a recording head 6 of a later-described image forming apparatus 3.

When the color image forming sheet 1 having a set of three-color bands of the cyan line CL, the magenta line ML and yellow line YL as one unit of color expression is processed by means of the image forming apparatus 3 described later, the lines on the color image forming sheet 1 will run in parallel with the direction of sub scanning intersecting at right angles with these lines, in relation to the direction of feed (direction of main scanning) of the color image forming sheet 1 in the image forming apparatus 3. And one line in the direction of the sub scanning of the image (later-described plotted image) to be formed corresponds to three lines of adjacent cyan line CL, magenta line ML and yellow line YL on the color image forming sheet 1. In each line, print or non-print of a black covering means is selected by each dot divided in the longitudinal direction. Thus these three lines express designated colors by each set of three-color dots in the direction of sub scanning. After the color portion required is covered with black color, the color areas including the covered color portion are mixed by each set of three color dots constituting the color areas of the color image forming sheet 1, thereby presenting a print image of desired colors on the color image forming sheet 1.

An explanation will be given on the image forming apparatus 3 of the present example for forming a print image of desired colors on the color image forming sheet 1. The image forming apparatus 3 forms black dots of a size corresponding to the width of each line constituting the color area selectively on the color image forming sheet 1 to thereby cover a part of the color, thus forming an image of desired colors on the image forming sheet.

Figure 1:
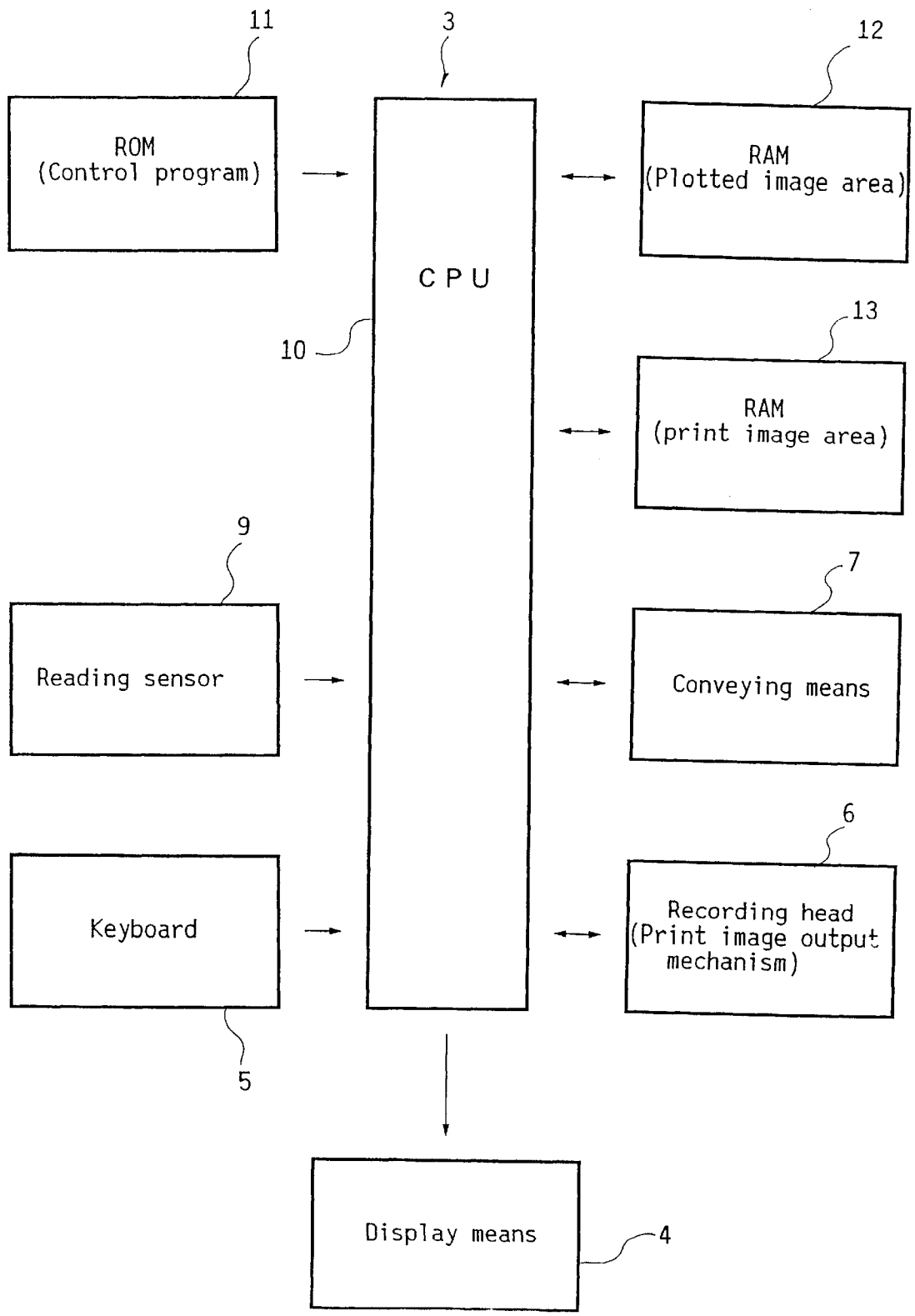
FIG. 1 is a block diagram showing the constitution of the first embodiment of the present invention.

The image forming apparatus 3, as shown in FIGS. 1 with 4, has a display means 4, such as a liquid-crystal display device, etc., for displaying a plotted image to be formed, on the screen of the display. Also it has a keyboard 5 as an input means for operating the image forming apparatus 3, such as color designation for the plotted image displayed on the display means 4. Furthermore it has a recording head 6 as a recording means for selectively forming black dots on each of the three-color lines constituting the color areas of the color image forming sheet 1. Furthermore it has a conveying means 7 for conveying the color image forming sheet 1 in a direction (direction of main scanning) which intersects at right angles with the line of each color of the color areas.

The display means 4 displays a plotted image formed by data inputted by operation on the keyboard 5 or by data given from outside. When the plotted image displayed Is not colored, it is possible to designate, from the keyboard 5, colors to be used in each area on the display. In the present example there can be designated eight colors in all including six colors obtainable by combining the three colors of cyan, magenta and yellow which constitute the color areas of the color image forming sheet 1, a black color obtainable when three color dots are changed to black, and a white color (a ground color of a mixture of cyan, magenta and yellow) obtained when no change is made to the three color dots.

The recording head 6 has a plurality of heating elements 8 as recording elements shown in FIG. 2, and a black transfer ribbon. These heating elements 8 thermally transfer black carbon particles from the black transfer ribbon to form black dots on the line of each color on the color image forming sheet 1. The heating elements 8 are arranged in the direction of main scanning. The external shape and dimensions of each heating element 8 correspond to the width of the line of each color constituting the color area of the color image forming sheet 1.

With the conveyance of the color image forming sheet 1 in the direction of main scanning, the recording head 6 drives each heating element 8 while moving in the direction of sub scanning which intersects with the direction of main scanning. At least a part of the three-color lines constituting the color areas on the color image forming sheet 1 is covered with black dots, thereby forming a print image of designated colors on the color image forming sheet 1 by the mixture of colors not covered.

As shown in FIG. 2, the image forming device 3 has a reading sensor 9 as a detecting means which outputs a detection signal by detecting the position of the color areas and the positioning mark 2 of the color image forming sheet 1. The reading sensor 9 has an LED 9a as a light source for producing for example a red beam of light onto the color image forming sheet 1, and a photo sensor 9b which, upon receiving the beam of light reflected from the color image forming sheet 1, outputs the detection signal.

As shown in FIG. 1, the image forming apparatus 3 has a CPU 10 as a control means. The CPU 10 produces print image data for forming a print image on the color image forming sheet 1 from data showing a plotted image stored in a RAM 12, in accordance with a control program stored in a ROM 11, and stores the data in a RAM 13. Furthermore, the conveying means 7 is driven according to the detection signal from the reading sensor 9, and the recording head 6 is driven according to the print image data in synchronism with the driving of the conveying means 7. At least a part of the three-color line constituting the color area of the color image forming sheet 1 is covered with black dots, forming a print image of designated colors on the color image forming sheet 1 by using a mixture in colors not covered of the color area.

Next, a method for forming a color image by the use of the image forming apparatus 3 and the color image forming sheet 1 will be explained. FIG. 5 is a flowchart showing a data processing procedure in the image forming apparatus 3. As indicated at S1, image plotting data showing a colored plotted image is inputted. The image plotting data may be inputted either by an operation for directly plotting an image on the display means 4 from the keyboard 5 or by directly inputting data prepared by another personal computer. As shown at S2, the image data thus inputted is stored by the RAM 12 which is a plotted image area; and at S3 whether or not the input of image data per page has been completed will be decided.

When the input of image data per page has been decided at S3, the image data per line in the direction of sub scanning of the plotted image will be taken out of the RAM 12, and the position of three lines of the yellow line YL, magenta line ML, and cyan line CL in the direction of sub scanning of the print image corresponding thereto will be determined.

The image plotting data for one line in the direction of sub scanning of the plotted image includes data of designated colors for each dot which divides the line in the direction of sub scanning. As shown at S5, the print image data consisting of three digits indicating 0 or 1, which respectively show "Black is not printed" and "Black is printed", is decided by the dots on each of yellow line YL, magenta line ML and cyan line CL in accordance with the data of designated colors for each dot included in the image plotting data for one line of the plotted image. The print image data is stored in the RAM 13.

The print image data will be "110" when the designated color is for example cyan (C) in the case the colors are shown in the order of the yellow line YL, magenta line ML and cyan line CL. That is, either of the yellow line YL and the magenta line ML is designated by "1", in which case an image is printed in black to be covered, while the cyan line CL is designated by "0" and therefore the color is exposed without being printed. For example, when the designated color is green (G), the print image data will be "010." That is, the magenta line ML is "1" and printed in black for covering, while the yellow line YL and the cyan line CL are "0" and not printed; the mixture of these colors, therefore, will be green. Similarly, the data will be "101" if the designated color is magenta (M); "011" if the designated color is yellow (Y); "001" if the designated color is red (R); "100" if the designated color is blue (B); "111" if the designated color is black (BK); and "000" if the designated color is white (W). However, the designated color "white (W)" is not limited to a perfect white and may be a mixture of the three primary colors, and colors of cream and pink groups depending upon the combination of reflection density of the three primary colors as described in the explanation of the color image forming sheet 1.

At S6, decision is made on whether or not the input of one page has been completed. When "completion" has been decided, the conveying means 7 is driven to feed the color image forming sheet 1 as shown at S7, and at the same time the detection of the positioning mark 2 of the color image forming sheet 1 is started by a detecting means.

After the detection of the positioning mark 2 at S8 and idle feed of a preliminary line provided on the color image forming sheet 1 as shown at S9, the print image data begins to be outputted from the RAM 13 to the recording head 6. As shown at S10, the print image data consisting of the line data of the yellow line YL, magenta line ML and cyan line CL is outputted to the recording head 6 in synchronization with the conveyance drive in the direction of main scanning of each image forming sheet 1 by the conveying means. Furthermore, as shown at S11, the operation at S1 is conducted for all lines in the direction of auxiliary operation of the image, to thereby check to see if or not the print image data per page has been outputted. When completion has been confirmed, printing will be ended.

The reading sensor 9 described above detects the positioning mark 2 of the color image forming sheet 1, but it should be noticed that each line of the yellow line YL, magenta line ML and cyan line CL which constitute the color area may be detected directly, so that, if the color image forming sheet 1 expands or contracts, black dots can be formed accurately along the line of each color on the color image forming sheet 1.

Another embodiment of the present invention will be explained with reference to FIG. 3. The recording head 6a has the same mechanical constitution as the recording head 6 shown in FIG. 2, but differs in the size and shape of a plurality of heating elements 8a which are recording elements. That is, the pitch of the arrangement of the heating elements 8a in the direction of main scanning agrees with a half of the width of line of each color constituting the color area of the color image forming sheet 1. According to such a constitution, three changes can be selected for each line of the yellow line YL, magenta line ML and cyan line CL: black printing on half of the line; black printing on all of the line; and entirely no black printing. Therefore it is possible to designate 64 colors in this example, notwithstanding eight colors including black and white that could be designated in the aforesaid example.

In each example heretofore explained, the black transfer ribbon and the recording heads 6 and 6a are used as means for changing the colors by color mixture by giving a partial change to the color area of the color image forming sheet 1, and each line of the three colors of the color area is covered with black dots when needed. However, the "change" to be added to the color area in the present invention is not limited to the above-described example. For example, the operation for covering a part of the color area with predetermined colors (chromatic colors, achromatic colors, metallic colors, fluorescent colors, and all other kinds of colors having various kinds of transparencies) is also one kind of change. An image of desired colors is formed with colors of a color area not covered and with colors of the covering means. The type of a cover material or the means for covering are not limited. For example, the cover may be effected by the use of a cover material of a predetermined color, such as printing, and by the use of a thermal color developing layer pre-coated on the surface of the color image forming sheet 1. The thermal color developing layer is usually transparent and turns into a predetermined color when heated, thus covering the color area of the ground. Also there may be adopted such an ink forming the color area that the color of the ink itself turns into a predetermined color with heat.

In each example explained above, the color area of the color image forming sheet 1 is constituted of three color lines (stripes) of the yellow line YL, magenta line ML, and cyan line CL, but at least two colors are sufficient. Furthermore the type of color arrangement in the color area may be other than the stripes if they can selectively change colors by each unit area expressing the colors (dots of three colors per set in the foregoing examples).

The image forming apparatus 3 of the present example can be obtained by partly modifying, as the present example, the function of a control means provided with a word processor having a monochromatic printing apparatus, or the function of a control means such as a personal computer having the monochromatic printing apparatus and a digital image processing function.

According to the image forming apparatus of the present invention, a print image of desired colors can be formed by a single printing operation by selectively changing by the recording means a desired part of the color area of the color image forming sheet regularly pre-formed. As a recording means, it is possible to use a monochromatic word processor printer which has already been widespread.

What is claimed is:

1. An image forming apparatus for use in forming a print image on a color image forming sheet on which a plurality of units, each unit being formed of plural color areas for showing one color portion, is formed repeatedly, comprising:

storing means for storing image plotting data showing color-plotted images;

control means electrically connected to the storing means, said control means translating said image plotting data into print image data including plural groups of digits, each of said groups having plural digits corresponding to the color areas in each of the units, said print image data showing whether or not each of the color areas on the color image forming sheet is to be printed;

detecting means electrically connected to the control means, said detecting means being adapted to detect a position of the color areas on the color image forming sheet relative to the image forming apparatus and outputting a detection signal upon detection of the position; and recording means electrically connected to the control means, said recording means forming dots with a predetermined color to selectively cover the plural color areas on the color image forming sheet according to the print image data and the detection signal from the detecting means thereby to produce the color-plotted image on the color image forming sheet.

2. An image forming apparatus according to claim 1, further comprising:

display means electrically connected to the control means for displaying the print image data and a color image thereof.

3. An image forming apparatus according to claim 2, further comprising conveying means adapted to convey said color image forming sheet in a predetermined direction.

4. An image forming apparatus according to claim 3, wherein said recording means includes a plurality of recording elements spaced apart from each other to correspond to the color areas including three colors of cyan, magenta and yellow.

5. An image forming apparatus according to claim 3, wherein said conveying means is adapted to convey said color image forming sheet in a direction perpendicular to the color areas having three color stripes of cyan, magenta and yellow; and said recording means is provided with a plurality of recording elements regularly arranged in the direction of conveyance of the color image forming sheet at a pitch corresponding to a pitch of the three color stripes on the color image forming sheet.

6. An image forming apparatus according to claim 5, wherein said recording means forms dots with a predetermined color at a size corresponding a width of the three color stripes on the color image forming sheet.

7. An image forming method for forming a print image on a color image forming sheet on which a plurality of units, each being formed of plural color areas for showing one color portion, is formed repeatedly, comprising:

storing image plotting data showing color-plotted images;

translating said image plotting data into print image data including plural groups of digits, each of said groups having plural digits corresponding to the color areas in each of the unites, said print image data showing whether or not each of the color areas on the color image forming sheet is to be printed;

detecting a position of the color areas on the color image forming sheet relative to the image forming apparatus and outputting a detection signal upon detection of the position; and selectively covering the plural color areas on the color image forming sheet by dots with a predetermined color according to the print image data and the detection signal to produce the color-plotted image on the color image forming sheet.

8. A combination comprising a color image forming sheet and an image forming apparatus for forming a print image on the color image forming sheet, wherein said color image forming sheet includes a plurality of units, each unit being formed of plural color stripes arranged side by side for showing one color portion and arranged on the sheet repeatedly, and said image forming apparatus includes:

storing means for storing image plotting data showing color-plotted images;

control means electrically connected to the storing means, said control means translating said image plotting data into print image data including plural groups of digits, each of said groups having plural digits corresponding to parts of the color stripes in each of the units, said print image data showing whether or not each of the parts of the color stripes on the color image forming sheet is to be printed;

detecting means electrically connected to the control means, said detecting means detecting a position of the color areas on the color image forming sheet relative to the image forming apparatus and outputting a detection signal upon detection of the position; and recording means electrically connected to the control means, said recording means forming dots with a predetermined color to selectively cover the parts of the color stripes on the color image forming sheet according to the print image data and the detection signal from the detecting means thereby to produce the color-plotted image on the color image forming sheet.

* * * * *